United States Patent [19]
Tsuchiya

[11] 4,130,033
[45] Dec. 19, 1978

[54] MULTIPLE SPINDLE AUTOMATIC SCREW MACHINE

[76] Inventor: Yoshifumi Tsuchiya, 6 of 1373, Baigo 6, Ohme-shi, Tokyo, Japan

[21] Appl. No.: 804,282

[22] Filed: Jun. 7, 1977

[30] Foreign Application Priority Data

Aug. 13, 1976 [JP] Japan .................... 51-96788

[51] Int. Cl.² .................. B23B 9/04; B23B 11/00
[52] U.S. Cl. ........................ 82/3; 29/27 C; 29/37 A
[58] Field of Search .............. 82/3, 2.5, 2.7; 29/38 A, 38 B, 27 C, 27 R, 37 A, 37 R

[56] References Cited

U.S. PATENT DOCUMENTS

| | | | |
|---|---|---|---|
| 3,124,986 | 3/1964 | Bader et al. | 29/38 B |
| 3,685,111 | 8/1972 | Nemoto | 82/3 X |

FOREIGN PATENT DOCUMENTS

1373152  11/1974  United Kingdom ................ 82/3

Primary Examiner—Leonidas Vlachos
Attorney, Agent, or Firm—Fidelman, Wolffe & Waldron

[57] ABSTRACT

A multiple spindle automatic screw machine wherein in order to work small-diameter and relatively lengthy rods with high accuracy, the rods to be worked are supported by guide bushes incorporated integral with working tools into tool brackets in a working position with a tooling column held close to a spindle column, the tooling column being provided with a working tool drive mechanism for allowing the working tools to effect their working operation, the working tools each being provided with a working tool adjusting mechanism.

4 Claims, 6 Drawing Figures

MULTIPLE SPINDLE AUTOMATIC SCREW MACHINE

The present invention relates to a multiple spindle automatic screw machine for indexing a number of spindles, for example, four to eight spindles, by an indexing drum to effect various kinds of working, and more particularly, to a precise multiple spindle automatic screw machine for working small-diameter and relatively lengthy rods with high accuracy.

Generally stated, multiple spindle automatic screw machines are so designed that a rotatably mounted indexing drum has four to eight spindles attached peripherally thereof in equally spaced apart, the indexing drum being intermittently rotatably operated in accordance with working programming to thereby sequentially feed the spindles to the working positions, so that workpieces clamped by the spindles are subjected to simultaneous different workings by the working tools disposed in the respective working positions.

In accordance with the multiple spindle automatic screw machines of the type as described, however, the workpieces are clamped by chucks located at the foremost ends of the spindles, and portions of the clamped workpieces projected from the spindles are subjected to working by means of the working tools while being moved radially and axially of the spindles. As a consequence, the distance from a working point at the foremost end of the working tool to a support point at the foremost end of the chuck by which the workpiece is clamped always varies. As this distance increases and as the workpiece's diameter decreases, the workpiece is caused to be oscillated in consequence of the displacement due to the cutting resistance, as well as the eccentricity of the spindle and workpiece and the like, resulting in a decrease in working accuracy.

Further, in the indexing operation for feeding the spindles to subsequent working positions, indexing errors are accumulated as the indexing operation proceeds if an error occurs in the positions of the spindles, resulting in another decrease in working accuracy.

In the present day, therefore, the conventional multiple spindle automatic screw machines have the limitation in accuracy so that one cannot expect the working with high accuracy, and particularly, the machines are not applied to work small-diameter and relatively lengthy rods.

A variety of multiple spindle automatic screw machines has been proposed heretofore in an effort to enhance the working accuracy by overcoming various disadvantages noted above with respect to prior art machines. However, multiple spindle automatic screw machines that may achieve satisfactory working accuracy have not yet been developed.

For instance, as one example, there is proposed an automatic screw machine which is designed so that a portion of a workpiece projected from the foremost end of a spindle is supported by a guide bush to control displacement of the workpiece caused by the cutting resistance. In accordance with this approach, the guide bush is rotated integral with an indexing drum as the spindles are indexed, and as a consequence, an indexing error directly produces an error in position of the guide bush, and the workpiece is to be subjected to working while being supported by the guide bush suffered from such an error in position. Thus, this process is incapable of removing the indexing error to attain working with high accuracy.

It is therefore an object of the present invention to provide a multiple spindle automatic screw machine in which an error in indexing of positions of spindles can be positively eliminated at a support point of a rod to be worked supported by a guide bush to thereby accomplish working with high accuracy irrespective of the error in indexing the spindles.

The above and other objects and advantages of the present invention will be fully understood by reading the following detailed description in connection with the accompanying drawings and claims. It is however to be understood that the embodiment illustrated herein is only for explanation and therefore the scope of the present invention is not desired to be limited thereby.

The drawings illustrate one embodiment in accordance with the present invention, in which.

The present invention will now be described with reference to an embodiment shown in the accompanying drawings.

Figure 1:
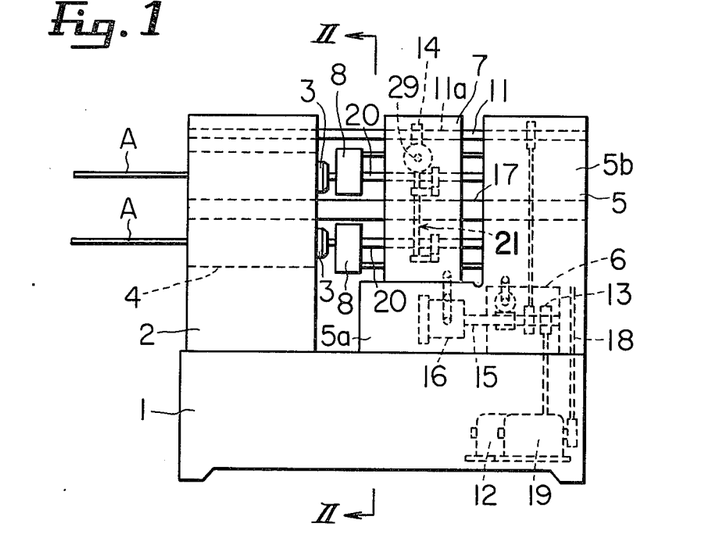
FIG. 1 is a side elevation schematically showing the entire construction.

Referring now to FIG. 1, there is shown the entire structure of a multiple spindle automatic screw machine in accordance with the present invention, an example of the machine with four spindles arranged being illustrated in this embodiment.

In FIG. 1, a bed indicated at 1 has a spindle column 2 located at one side thereof. This spindle column 2 is interiorly and rotatably provided with an indexing drum 4 encasing therein four spindles 3. Rods A to be worked fed by a material feeding device not shown (located on the lefthand in FIG. 1) axially pass through the spindles 3 and are clamped by chucks not shown located at the foremost ends of the spindles.

The bed 1 further has an inverted L shaped driving column 5, which is provided with a horizontal portion 5a and a vertical portion 5b, disposed oppositely of the spindle column 2, the driving column 5 encasing therein a drive mechanism 6.

The horizontal portion 5a of the driving column 5 has a tooling column 7 to be movable towards and away in the axial direction of the spindles 3 from the spindle column 2.

This tooling column 7 has tool brackets 8 mounted thereon corresponding to the spindles 3, respectively, each of these tool brackets 8 integrally incorporating therein guide bushes 9 and working tools 10a, 10b adapted to work the works (rods) A, said guide bushes supporting portions of the works (rods) A clamped by the chucks projected from the spindles 3, when the tooling column 7 is moved close to the spindle column 2.

That is, the operation of the tooling column 7 moving towards the spindle column 2 enables the guide bushes 9 to be positioned at support point A′ of the works (rods) A, whereas the operation of the tooling column 7 moving away from the spindle column 2 enables the guide bushes 8 to move away from the works (rods) A for allowing the indexing drum 4 to be rotated.

More specifically, the tooling column 7 is provided with a working tool driving mechanism 21 for permitting the working tools 10a, 10b to effect working operation thereof.

That is, a cam shaft 11 is disposed extending through the spindle column 2, the vertical portion 5b of the driving column 5 and the tooling column 7, the cam shaft 11 being so mounted that it may be rotated relative to the spindle column 2 and the vertical portion 5b of the driving column 5 opposedly located but may not be moved in the axial direction, the cam shaft 11 being also formed with a spline shaft 11a in a portion in which the former extends through the tooling column 7 so as to allow the tooling column 7 to be moved axially relative to the cam shaft 11.

Disposed within the bed 1 is a cam shaft driving motor 12, which is connected to the cam shaft 11 through a transmission gearing 13 or the like which forms the drive mechanism 6 within the driving column 5.

This cam shaft 11 is provided with control cams (not shown) for the purposes of allowing the chuck attached to the foremost end of the spindle to be opened and closed, the spindles 3 to be stopped temporarily, and an indexing pin to be entered, within the spindle column 2.

It is to be noted that a controlling mechanism by use of the aforesaid control cam is well-known, the detailed description thereof being omitted herein.

Mounted on the spline shaft 11a of the cam shaft 11 is a screw gear 14 for transmitting a power to a cam shaft 29 required for tooling described later within the tooling column 7, the screw gear 14 being allowed only for relative movement axially to the cam shaft 11.

Mounted within the driving column 5 is another cam shaft 15, which is provided with a cam 16 for moving the tooling column 7 in the axial direction of the spindles 3.

This cam shaft 15 is also connected to the cam shaft driving motor 12 through the drive mechanism 6.

A central shaft 17, which extends through the spindle column 2, the vertical portion 5b of the driving column 5 and the tooling column 7, is positioned in the center of the indexing drum 4, the central shaft 17 rotatably encasing a spindle drive shaft (not shown) axially extended therethrough, the spindle drive shaft being connected to a spindle driving motor 19 positioned within the bed 1 through a transmission gearing 18 or the like which forms the drive mechanism 6 within the driving column 5.

The central shaft 17 is provided with an indexing mechanism (not shown) having a Geneva gear or the like so that the indexing drum 4 may be rotated peripherally by the central shaft 17 to provide indexing of the spindles 3.

It is to be noted in this embodiment that the drive mechanism, the indexing mechanism and the like for the spindles 3 are similar in construction to those of well-known multiple spindle automatic screw machines, the description thereof being omitted herein.

Four tool brackets 8 are provided frontwardly of the above-mentioned four spindles 3, respectively, correspondingly thereto, the tool brackets 8 being readily removably secured to shafts 20, which extend through and are supported on the tooling column 7, the shafts 20 being disposed movably only in the axial direction by the working tool driving mechanism 21 located within the tooling column 7.

Figure 2:
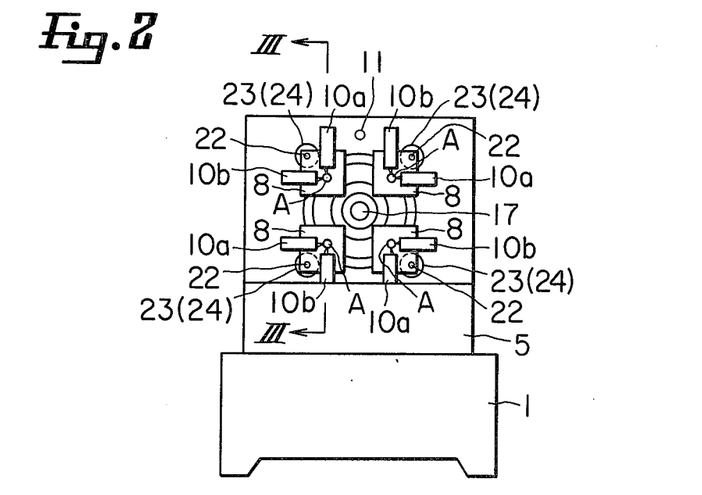
FIG. 2 is a schematic front elevation taken on line II — II of FIG. 1.

That is, the tool brackets 8 are arranged in equally angled spaced apart as shown in FIG. 2 so that they are peripherally locked by the tooling column 7 but are movable in the axial direction.

Two working tools 10a and 10b such as cutting tools are radially movably attached to each of the tool brackets 8.

These working tools 10a, 10b are individually controlled by cams 23, 24, respectively, fixedly mounted on cam shafts 22, respectively.

That is, these cam shafts 22 are rotatably and axially movably supported on the tooling column 7 through bearings 25, the foremost ends of the cam shafts 22 projected from the tooling column 7 towards the spindles 3 rotatably extending through the tool brackets 8.

The spline shaft 11a of the cam shaft 11 has a spline sleeve 26 meshed therewith, and a sleeve 27 secured to the spline sleeve 26 has a screw gear 14 fixedly mounted thereon.

The sleeve 27 is rotatably supported on the tooling column 7 through bearings 28, 28.

Figure 3:
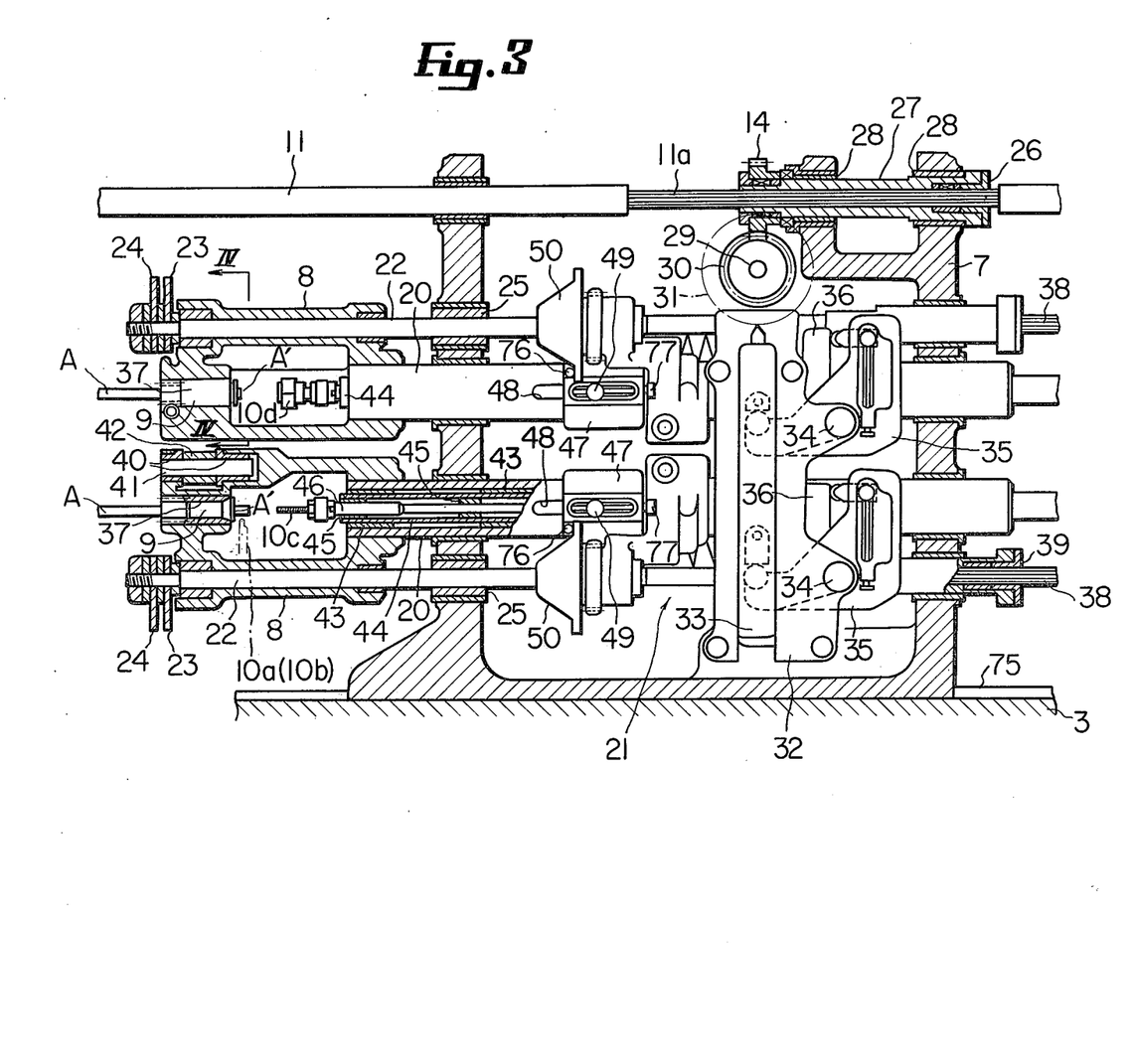
FIG. 3 is an enlarged sectional view taken on line III — III of FIG. 2.

In FIG. 3, a cam shaft 29 is disposed perpendicularly to the paper surface, the cam shaft 29 being rotatably supported on the tooling column 7 through bearings (not shown).

A screw gear 30 fixedly mounted on the cam shaft 29 is meshed with the screw gear 14.

Cams 31, which feed the shafts 20 in the axial direction, are fixedly mounted on the cam shaft 29.

That is, a shaft drive body 32 is fixedly mounted on the tooling column 7, the shaft drive body 32 being provided with four sliders 33 which are slidable vertically to the paper surface of FIG. 3. Cranks 35 pivotally supported on the tooling column by pins 34 are rotated by vertical movement of the sliders 33 for allowing the shafts 20 to be individually reciprocated in the axial direction through plates 36 fixedly mounted on the shafts 20.

The tool brackets 8 further have guide bushes 9 fixedly mounted thereon through bush holders 37 to be positioned on the axes of the spindles 3, and portions of the works (rods) A clamped at the spindles 3 projected therefrom are inserted through guide holes (not shown) made in the guide bushes 9 so as to be supported to prevent them from having to sustain radial oscillations.

The cam shafts 22 are secured to spline sleeves 39 meshed with spline shafts 38, respectively, rotated by a drive mechanism (not shown) located within the driving column 5, the cams 23 and 24 being fixedly mounted on the foremost ends of the cam shafts 22 projected from the tool brackets 8.

The tools 10a and 10b are radially fed by the cams 23 and 24, which will be described later.

The tool brackets 8 have pins 41 rotatably supported thereon through bearings 40, the pins 41 being provided with pivotal arms 42.

Mounted within the shafts 20 are sleeves 44 axially slidably disposed by bearings 43 or the like, and tooling spindles 46 rotatably mounted by bearings 45 or the like are opposedly arranged to the guide bushes 9 within inner holes of the sleeves 44.

Attached to the foremost ends of the tooling spindles 46 projected from the sleeves 44 are working tools 10c, 10d such as drills, taps, dies and the like, to thereby effect operations such as drilling, thread cutting or the like for the foremost ends of the works (rods) A.

It is to be noted that the tooling spindles 46 are rotatably driven by a drive mechanism (not shown) located within the driving column 5.

The shafts 20 have arms 47 disposed slidably thereto, the arms 47 being connected to sleeves 44 which pass through slots 48 formed in the shafts 20.

Fixedly mounted on the cam shafts 22 are cams 50, which are connected to pins 76 projected from the arms 47, the cams 50 causing tooling spindles 46 together with the sleeves 44 to be advanced and or retreated axially of the spindles 3 through the pins 76, the arms 47 and the pins 49 when the cam shafts 22 are rotated.

The pins 49 are mounted on the arms 47 so that the former may adjustably be moved axially of the spindles 3 by adjusting screws 77 which form a working tool adjusting mechanism to thereby adjust the relative positions of the working tools 10c, 10d to the guide bushes 9.

Figure 4:
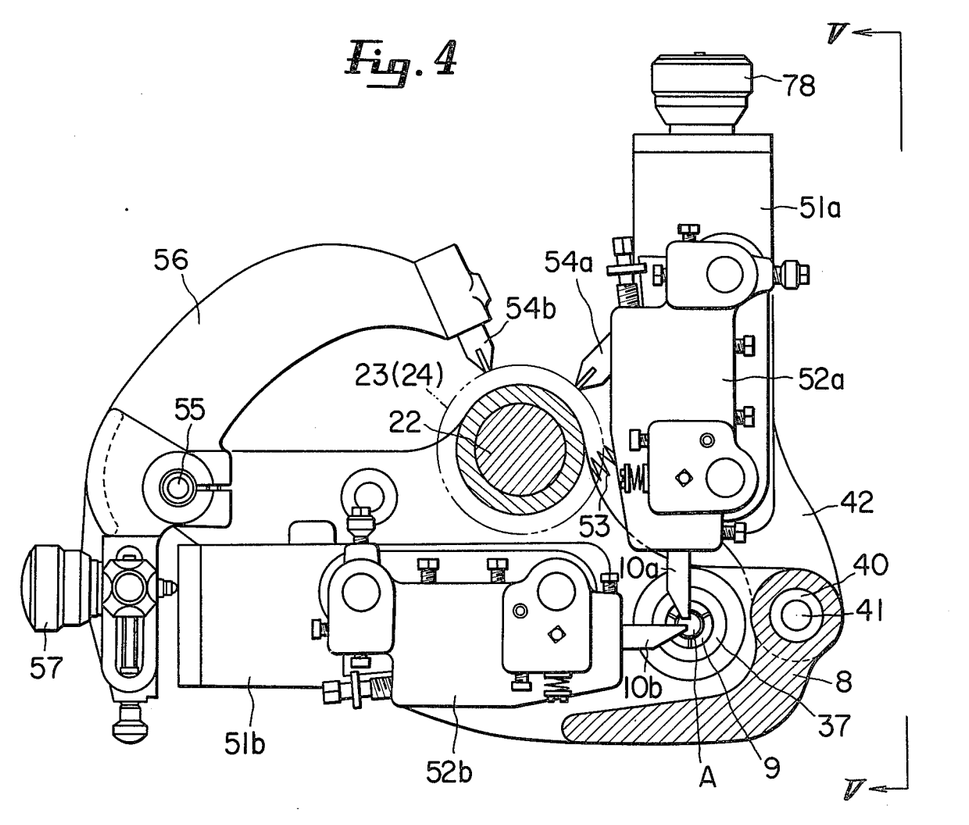
FIG. 4 is an enlarged sectional view taken on line IV — IV of FIG. 3.
Figure 5:
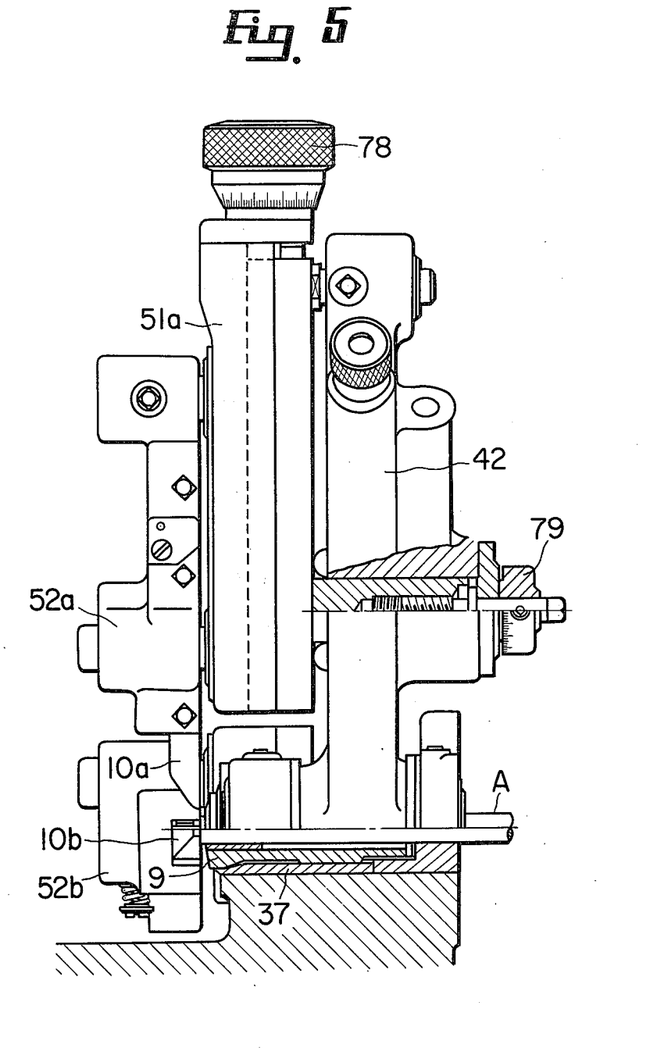
FIG. 5 is a side elevation taken on line V — V of FIG. 4.

While a single bracket 8 portion is illustrated in FIGS. 4 and 5 for the convenience of description, this will be described for the purpose of omitting the description with respect to other three brackets 8 which are similar in construction to the one first mentioned.

In FIG. 4, the tool bracket 8 has the pivotal arm 42 pivotally mounted about the pin 41, and as shown also in FIG. 5, the pivotal arm 42 has a pad 51a mounted thereon in such a manner that the latter may adjustably be moved radially of the spindle 3 by an adjusting screw 78 which is a working tool adjusting mechanism and axially of the spindle 3 by an adjusting screw 79 which is a working tool adjusting mechanism so as to adjust the relative position to the guide bush 9. A tool rest 52a has the working tool 10a secured thereto and is fixedly mounted on the pad 51a.

This pivotal arm 42 is applied with a turning force counterclockwise in FIG. 4 by a tension spring 53, and a pawl 54a fixedly mounted on the pad 51a may trace a locus of the cam 23 mounted on the cam shaft 22 whereby the working tool 10a may pivot about the pin 41.

On the other hand, the tool bracket 8 has a guide member (not shwon since it is positioned on the back of the paper surface in FIG. 4) fixedly mounted thereon, the guide member having a pad 51b mounted slidably in the radial direction of the spindle 3, and a tool rest 52b is fixedly mounted on the pad 51b with the working tool 10b secured thereto.

A crank 56 is secured to the pin 55 rotatably mounted on the tool bracket 8, and a pawl 54b at one end of the crank 56 may trace a locus of the cam 24 mounted on the cam shaft 22 whereby the foremost end of the adjusting screw 57 which is a working tool adjusting mechanism mounted on the other end of the crank 56 causes the working tool 10b to effect linear feeding and or linear retreatment in the radial direction of the spindle 3 along the aforementioned guide member through the pad 51b.

The guide members has the pad 51b mounted thereon in such a manner that the latter may adjustably be moved radially of the spindle 3 by the adjusting screw 57 and axially of the spindle 3 by the other adjusting screw (not shown) which is a working tool adjusting mechanism so as to adjust the relative position to the guide bush 9.

In carrying out the present embodiment, a present type tool rest capable of centering outside the machine disclosed by the present applicant in U.S. Pat. No. 3,916,730 is used. The tool brackets 8 are of the unit type as is apparent from the foregoing, and therefore, where working tools for lateral drilling, milling or the like are required as a result of change in working specification of products, all that need be done is to secure enough time to attach and remove the tool brackets to the shafts provided that tool brackets with necessary working tools and guide bushes incorporated beforehand. This results in a considerable reduction in time for machine stoppage when unnecessary working tools are disassembled and necessary working tools are incorporated as has been encountered in prior art, thereby affording effects in enhancement of productivity.

Figure 6:
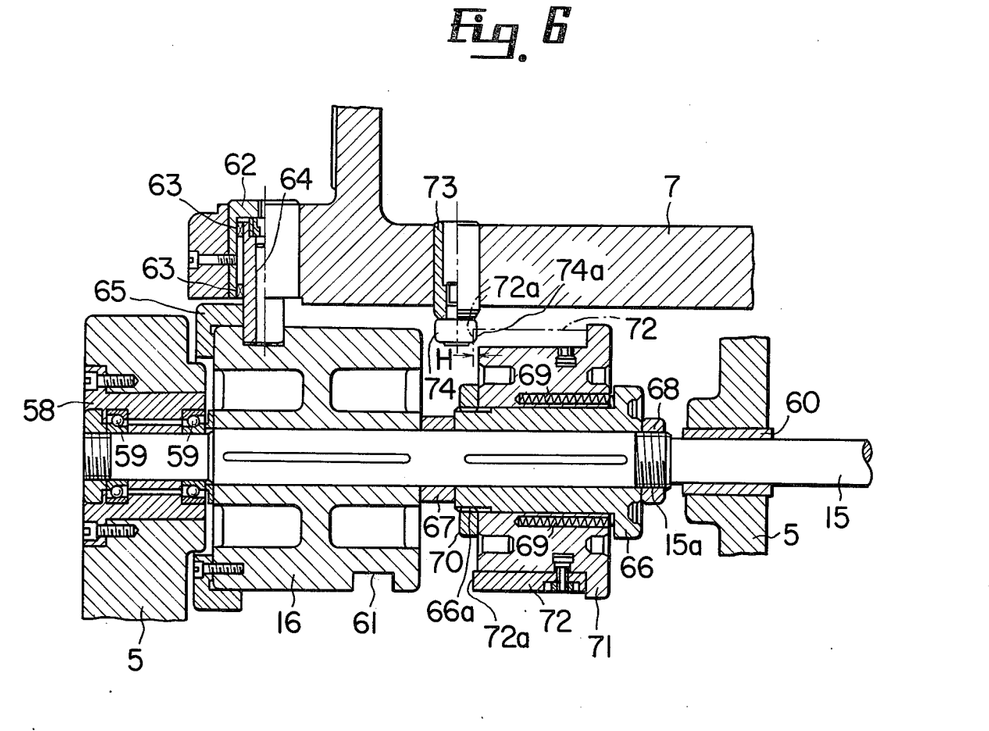
FIG. 6 is a longitudinal sectional side elevation showing a drive mechanism for moving a tooling column.

In FIG. 6, a drive mechanism for moving the tooling column 7 is shown.

That is, at the time of indexing the spindles, the indexing operation cannot be carried out unless the works A are pulled out of the guide holes in the guide bushes 9, and for this reason, the tooling column 7 is moved back to a predetermined position for allowing the formost end of the works A to be moved to a position not in contact with the tool brackets 8 or guide bushes 9 for the indexing operation.

That is, the cam shaft 15 has its opposite ends (only one end is shown) rotatably supported, with its thrust eliminated, by angular ball bearings 59 received within the sleeve 58 secured to the driving column 5, the cam shaft 15 having its intermediate portion supported on the driving column 5 through a bearing 60 whereby the cam shaft 15 may rotatably be driven by the cam shaft driving motor 12 as previously mentioned.

The cam 16 fixedly mounted on the cam shaft 15 is formed with a controlling recess 61 so that the foremost end of a rotatable pin 64, which is carried within a cylindrical member 62 secured to the tooling column 7 by bearings 63, is received into the controlling recess 61.

A restrainer member 65 is secured by screw to the cam 16 so that when the pin 64 is moved leftwards in FIG. 6 along the controlling recess 61 and at the same time the tooling column 7 is moved towards the spindles 3 along the guide rail 75 of the driving column 5 shown in FIG. 3 until it advances to a position closest to the spindles 3, the pin 64 comes in contact with the restrainer member 65 to restrain further movement of the tooling column 7.

The cam shaft 15 has a sleeve 66 and a collar 67, which is positioned between said sleeve 66 and the cam 16, fitted thereon, the sleeve 66 being secured to the cam shaft 15 by fastening the sleeve 66 towards the cam 16 through the collar 67 by a nut 68 in engagement with threads 15a formed in the cam shaft 15.

In the outer peripheral surface of the sleeve 66 there is disposed a cam retaining member 71 slidably only in the axial direction, which is urged by a nut 70 in engagement with threads 66a of the sleeve 66 by the spring force of compression springs 69, the cam retaining member 71 having a cam 72 secured by screw to the outer peripheral surface thereof.

On the other hand, the tooling column 7 has a pin 73 fixedly mounted thereon, and a cam follower 74 is mounted on the foremost end of the pin 73 projected towards the cam shaft 15.

The right end 74a in the outer peripheral surface of the cam follower 74 faces to come into contact with a left end cam surface 72a of the cam 72 and is held to be positioned rightwards by distance H away from the left end cam surface 72a when the cam 72 is in the extreme left end position, whereby when the cam 72 begins to come into contact with the right end 74a of the cam follower 74 of the pin 73 resulting from rotation of the cam retaining member 71, the cam retaining member 71 is begun to be moved rightwards against the spring force of the compression springs 69. When the left end cam surface 72a of the cam 72 positioned in the extreme left end position comes into contact with the cam follower 74, that is, when the pin 64 comes into contact with the restrainer member 65, the cam retaining member 71 moves rightwards by distance H to produce the spring force of the compression springs 69, by which the pin 64 is resiliently urged into contact with the restrainer member 65 eliminating a clearance between the pin and the controlling recess 61.

The multiple spindle automatic screw machine constructed as described above operates as follows.

First, the works (rods) A are clamped by the chucks positioned at the foremost ends of the spindles 3 and are indexed by rotation of the indexing drum 4 to be fed to the desired positions.

The cam shaft 15 is then rotatably driven by the cam shaft driving motor 12 for allowing the tooling column 7 to be moved towards the spindle column 2 in the axial direction of the spindles 3 through the pin 64 received in the controlling recess 61 of the cam 16.

At the position wherein the pin 64 of the tooling column 7 comes into contact with the restrainer member 65, the cam surface 72a of the cam 72 on the cam shaft 15 comes into contact with the cam follower 74 of the pin 73 in the tooling column 7, whereby the pin 64 resiliently comes into contact with the restrainer member 65 eliminating a clearance between the pin and the controlling recess 61.

Thereafter, during the period wherein the cam shaft 15 is rotating to the desired angular position, the tooling column 7 stays at that position by the provision of the controlling recess 61 so that working operation by means of the working tools 10a, 10b, 10c, 10d ... may be carried out.

In this state, the guide bushes 9 of the tool brackets 8 are positioned at the support point A' of the works (rods) A, and the support point A' is inserted and supported in the guide holes in the guide bushes 9.

In this state, then, the foremost ends of the works (rods) A projected frontwardly of the guide bushes 9 are machined by the working tools 10a, 10b, 10c, 10d.

That is, the cam shaft 11 is rotatably driven by the cam shaft driving motor 12, and the cams 31 on the cam shaft 29 are rotated through the screw gear 14 of the cam shaft 11 and the screw gear 30 meshed with the screw gear 14.

These cams 31 are caused to move the sliders 33 according to the respective predetermined working operations to move the shafts 20 towards the respective spindles 3 so that the working tools 10a, 10b attached to the brackets 8 may be caused to effect their axial feeding and working operation relative to the works (rods) A.

The spline shafts 38 are rotatably driven by the drive mechanism to rotate the cam shafts 22 integral with the spline shafts 38 thereby rotating the cams 23 and 24 on the cam shafts 22.

Thereby, the pivotal arms 42 are rotated by the cams 23 through the pawls 54a to feed the working tool 10a in the radial direction of the works A, and in turn, the cranks 56 are rotated by the cams 24 through the pawls 54b to feed the working tools 10b in the radial direction of the work A to be machined. Upon completion of the desired operation, the working tools 10a and 10b are moved back to their original positions with the aid of cams 23 and 24.

When the cam shafts 22 are operated to be rotated, the cams 50 rotate and the tooling spindles 46 advance towards the spindles 3 together with the sleeves 44 through the cams 47, whereby operations such as drilling, thread cutting and the like are applied to the foremost ends of the works (rods) A by the working tools 10c, 10d on the tooling spindles 46 rotated by the drive mechanism.

Upon completion of the desired operation, the working tools 10c, 10d are again moved back to their original positions with the aid of cams 50.

Also, the shafts 20 and tool brackets 8 thus advanced towards the spindles 3 by the cams 31 are again moved back to their original positions with the aid of cams 31.

Upon completion of the desired working operation as described above, the indexing operation for successive working is then carried out.

That is, the cam 16 on the cam shaft 15 is rotated by the cam shaft driving motor 12 to move the tooling column 7 away from the spindle column 2 in the axial direction of the spindles 3 through the pin 64 received in the controlling recess 61 of the cam 16, and the works (rods) A are pulled out of the guide holes in the guide bushes 9 to move the guide bushes 9 and tool brackets 8 away from the works (rods) A, after which in this state, the indexing drum 4 is rotated for the execution of indexing.

It is to be noted that after completion of indexing, various drive mechanisms are actuated and the abovementioned operations are repeated in order to shift into the succeeding operations.

In this manner, the works A are successively fed to the respective steps of operation by the indexing operation and after the works A have been subjected to four steps, they are finally cut into the product length to obtain finished products.

While the case where the tooling column is moved in the axial direction of the spindle for accomplishment of indexing by the indexing drum has been described in the abovementioned embodiment, it will be understood that a head stock may be moved to thereby move the works away from the guide bushes for accomplishment of indexing by the indexing drum.

As is obvious from the preceding detailed description, the work may be supported on the guide bush integrally incorporated with the working tools in the tool bracket in a position wherein the tooling column is moved close to the spindle column to thereby positively eliminate an indexing error in each of spindle positions at the suppot point of the work by means of the guide bush.

Further, since the guide bushes and working tools are integrally incorporated into the tool brackets, the rigidity between the guide bush and the working tool is enhanced to provide working with high accuracy irrespective of the error in indexing the spindles.

Furthermore, the relative position of the working tool to the guide bush may be adjusted by the working tool adjusting mechanism attached to the working tool to eliminate all of errors within the tool bracket, resulting in a considerable increase in working accuracy as compared with conventional multiple spindle automatic screw machines of the type as described.

In addition, since the guide bush for supporting the portion of the work projected from the spindle and the working tool for working the work carried by the guide bush are integrally incorporated in the tool bracket, the machine of the invention affords the advantages that the distance from the support point by means of the guide bush to the working point by means of the working tool may be rendered constant even by axial movement of the working tool to further enhance the working accuracy of the works.

Moreover, since the guide bush and working tool are integrally incorporated in the tool bracket, the tool bracket may be replaced as a unit to considerably reduce time for replacement thereof and to greatly enhance productivity.

What is claimed is:

1. A multiple spindle automatic screw machine comprising:
   a plurality of work spindles each work spindle for holding a workpiece extending frontwardly thereof, said work spindles peripherally and equally spaced around an indexing drum;
   a plurality of tool brackets, the number of said tool brackets equalling the number of said work spindles, said tool brackets opposedly mounted frontwardly of said work spindles, said tool brackets each including a guide bush in fixed relationship thereto to support said workpiece;
   working tools mounted on each of said tool brackets;
   means for producing relative motion between said workpieces and said working tools;
   means for rotationally indexing said indexing drum with said work spindles, whereby each of said work spindles in turn opposes each of said tool brackets;
   means for reciprocally translating said tool brackets with said guide bushes toward and away from said indexing drum and said work spindles, whereby said workpieces are translated away from said guide bushes for indexing said drum, and said workpieces are supported by said guide bushes when said tool brackets are translated toward said work spindles for machining of said workpieces;
   a bed, said bed supporting said indexing drum and said tool brackets;
   whereby the relationship between each of said guide bushes and each of said tool brackets is unchanged when said work spindles index said workpieces.

2. The multiple spindle screw machine of claim 1 wherein said working tools are movable radially relative to the rotational axis of said opposed work spindle and said workpiece is movable parallel to the rotational axis of said spindles.

3. The multiple spindle automatic screw machine according to claim 1 and further comprising a tooling column arranged frontwardly of said indexing drum, shafts opposedly disposed frontwardly of said work spindles and axially movably mounted on said tooling column, sleeves axially movably disposed in inner holes of said shafts, means for moving said sleeves in the axial direction, and tooling spindles only rotatably supported in the inner holes of said sleeves, said shafts having tool brackets fixedly mounted on the spindle side thereof, said shafts being moved in the axial direction to thereby provide an axial feed of said working tools to the workpieces.

4. The multiple spindle automatic screw machine according to claim 3, characterized in that said tool brackets are removably mounted on extremities of said shafts.

* * * * *